United States Patent Office 2,773,796
Patented Dec. 11, 1956

2,773,796

METHOD OF PROTECTING PLANTS FROM FUNGI BY APPLYING HYDRAZINE SALTS OF INORGANIC PHOSPHOROUS ACIDS

Johannes Thomas Hackmann and Gerarda Francisca Elisa Maria Dierick, Amsterdam, Netherlands, assignors to Shell Development Company, Emeryville, Calif., a corporation of Delaware No Drawing. Application September 16, 1953, Serial No. 380,607

Claims priority, application Germany September 26, 1952

5 Claims. (Cl. 167—14)

This invention relates to a method of combating pests. More particularly, it relates to a method of protecting plants from destruction by pests such as fungi.

It is known that hydrazine (or hydrazine hydrate) is a toxic material. However, this compound is completely unusable for treating plants because of its extreme phytotoxicity.

It has now been found that salts of hydrazine and inorganic oxygen acids of phosphorus can be employed for treating plants to prevent their destruction by pests without substantial damage to the plants.

Typical hydrazine salts which can be used in accordance with the present invention are the hydrazine salts of phosphoric acid, phosphorous acid, hypophosphoric acid, pyrophosphoric acid, and the like, wherein the salts are essentially free of metal constituents. The present hydrazine salts need not necessarily be neutral. The hydrazine salts preferred are those in which the mole ratio of acid to hydrazine is from about 0.5:1 to about 2:1.

The hydrazine salts of the present invention can be prepared by any conventional method, for example, by reacting a solution of hydrazine with the desired acid, by reacting a solution, preferably an alcoholic solution, of a hydrazine salt with the desired acid, or by reacting a solution, preferably an alcoholic solution, of a hydrazine salt with a salt of the desired acid.

The hydrazine salts of the present invention need not be employed in a pure condition. Inactive admixtures which have been formed in the commercial preparation of the hydrazine salts can be present.

The hydrazine salts of the invention can be used alone or in combination with other fungicidal, viricidal, insecticidal or acaricidal materials, the action of which may be either internal or external, with plant nutritives, with plant hormones, and the like. Wetting agents and, if necessary or desirable, stickers can be present. The present hydrazine salts are preferably applied in the form of aqueous solutions or suspensions. Aqueous solutions or suspensions containing from about 0.01 to about 1% by weight, and preferably from about 0.1 to about 0.5% by weight, of the hydrazine salt are particulaarly suitable.

The active agents of the present invention are particularly suitable as foliage fungicides because of their high fungitoxicity and low phytotoxicity. However, these materials are also suitable for treating animals as well as inanimate materials to prevent attack thereof by parasites and pests, such as fungi, insects, bacteria, and the like.

The invention is illustrated by the following examples which are not to be considered as limiting the specification and claims in any manner:

EXAMPLE I

Cucumber plants having a height of about 10 cms. were placed for four hours with their roots in various concentrations of solutions of the HCl, $H_2SO_4$, and $H_3PO_4$ salts of hydrazine. The cucumber plants were then replanted. The $H_3PO_4$ salt of hydrazine was found to be non-phytotoxic. Both the HCl and $H_2SO_4$ salts were found to be sufficiently phytotoxic to preclude their use as foliage fungicides.

EXAMPLE II

Shoots of strawberry plants were treated, for the purpose of combating Verticillium, with various concentrations of solutions of hydrazine hydrate and of the $H_3PO_4$ salt of hydrazine by placing the plants with their roots in the different solutions for a period of 24 hours. The plants were then replanted. After a week, the plants treated with hydrazine hydrate were dead, whereas the plants treated with the $H_3PO_4$ salt of hydrazine showed no damage of any kind.

EXAMPLE III

Salts of hydrazine with various oxygen acids of phosphorus were tested on various plants to determine their effectiveness as fungicides. The results are given in Table I. Their effectiveness as fungicides is indicated in the table as degree of suppression. The degree of suppression was determined in the following manner:

Test plants were sprayed with an aqueous solution of the active agent until the liquid dropped from the leaves. After the spray liquid dried, usually after about two days, the plants were exposed to contamination with the pathogen. Depending on the kind of test plant and of the fungus, contamination was effected either by inoculation of the plant or by placing the plant in contaminated surroundings, for example, in a greenhouse in which plants affected by the pathogen were present. Conditions were chosen such that the plants which were not treated with the active agent soon became diseased. After a certain period had elapsed, depending on the plant tested, the ratio of the affected leaf surface to the total leaf surface was determined for both the treated and the untreated plants. The quantity obtained by subtracting the quotient of these two numbers from one is a measure for the degree to which suppression of the pathogen has succeeded. This quantity, expressed in percent, is termed the degree of suppression. The degree of suppression was determined at a time at which the untreated plants showed clear symptoms of the disease. As a rule, the leaf surfaces were not measured, but estimated with the required accuracy. An experienced person can in this way determine the degree of suppression with an accuracy of about 5%. This accuracy is sufficient since, in general, results obtained in biological tests are only reproducible within rather wide limits.

For purposes of comparison, the degree of suppression obtained with the use of known fungicides is also given in the table.

*Table 1*

| Hydrazine Salt of— | Mol Acid per Mole Hydrazine | Fungus | Plant | Concentration of Sprayed Aqueous Solution (percent wt.) | Degree of Suppression | Comparison Spraying | | |
|---|---|---|---|---|---|---|---|---|
| | | | | | | Active Substance | Concentration of Sprayed Solution (percent wt.) | Degree of Suppression |
| Hypophosphoric acid ($H_2P_2O_6$) | 1 | *Phytophthora infestans* | Tomato | 0.1 | 95 | cupric oxychloride | 0.75 | 28 |
| Orthophosphoric acid ($H_3PO_4$) | 1 | do | do | 0.1 | 93 | do | 0.75 | 28 |
| Do | 2 | do | do | 0.1 | 75 | do | 0.75 | 28 |
| Do | 2 | *Septoria graveolentis* | Celery | 0.1 | 40 | ferrous dimethyldithiocarbamate. | 0.2 | 49 |
| Phosphorous acid ($H_3PO_3$) | 1 | *Phytophthora infestans* | Tomato | 0.1 | 88 | cupric oxychloride | 0.75 | 28 |
| Do | 1 | *Septoria graveolentis* | Celery | 0.1 | 70 | ferrous dimethyldithiocarbamate. | 0.2 | 49 |
| Do | 0.5 | *Phytophthora infestans* | Tomato | 0.1 | 88 | cupric oxychloride | 0.75 | 28 |
| Pyrophosphoric acid ($H_4P_2O_7$) | 0.5 | do | do | 0.1 | 70 | do | 0.75 | 5 |
| Do | 0.5 | do | do | 0.1 | 78 | do | 0.75 | 28 |
| Do | 0.5 | Rust | Corn plants | 0.1 | 46 | zinc bisdithiocarbamate. | 0.2 | 68 |
| Do | 0.5 | *Phytophthora infestans* | Potato | 0.1 | 32 | cupric oxychloride | 0.75 | 46 |
| Do | 0.5 | *Cladosporium fulvum* | Tomato | 0.1 | 56 | Salicylanilide | 0.6 | 33 |

From the data in the above table, it can be seen that, in general, the hydrazine salts of the present invention are far more effective at much lower concentrations than known fungicides.

We claim as our invention:

1. A method for protecting plants from destruction by fungi which comprises applying to the plants the hydrazine salt of an inorganic phosphorus acid selected from the group consisting of phosphoric acid, phosphorous acid, hypophosphoric acid, and pyrophosphoric acid in an amount toxic to said fungi, said hydrazine salt having a mole ratio of acid to hydrazine from 0.5:1 to 2:1 and being essentially free of metal constituents.

2. A method for protecting plants from destruction by fungi which comprises applying to the plants the hydrazine salt of hypophosphoric acid in an amount of toxic to said fungi, said hydrazine salt having a mole ratio of acid to hydrazine from 0.5:1 to 2:1 and being essentially free of metal constituents.

3. A method for protecting plants from destruction by fungi which comprises applying to the plants the hydrazine salt of phosphoric acid in an amount toxic to said fungi, said hydrazine salt having a mole ratio of acid to hydrazine from 0.5:1 to 2:1 and being essentially free of metal constituents.

4. A method for protecting plants from destruction by fungi which comprises applying to the plants the hydrazine salt of phosphorous acid in an amount toxic to said fungi, said hydrazine salt having a mole ratio of acid to hydrazine from 0.5:1 to 2:1 and being essentially free of metal constituents.

5. A method for protecting plants from destruction by fungi which comprises applying to the plants the hydrazine salt of pyrophosphoric acid in an amount toxic to said fungi, said hydrazine salt having a mole ratio of acid to hydrazine from 0.5:1 to 2:1 and being essentially free of metal constituents.

References Cited in the file of this patent

UNITED STATES PATENTS 2,659,688 Soule ---------- Nov. 17, 1953

OTHER REFERENCES

Merck Index, 5th edition, page 275, "Hydrazine Sulfate."